(12) United States Patent
Park

(10) Patent No.: US 8,610,555 B2
(45) Date of Patent: Dec. 17, 2013

(54) VEHICLE STOPPING AND MOVEMENT WARNING SENSOR

(76) Inventor: Ki-Woong Park, Alexandria, VA (US)

( * ) Notice: Subject to any disclaimer, the term of this patent is extended or adjusted under 35 U.S.C. 154(b) by 304 days.

(21) Appl. No.: 13/241,491

(22) Filed: Sep. 23, 2011

(65) Prior Publication Data

US 2013/0076505 A1    Mar. 28, 2013

(51) Int. Cl.
*B60Q 1/50* (2006.01)

(52) U.S. Cl.
USPC .......................................... 340/467

(58) Field of Classification Search
USPC ........... 340/467, 438, 463, 468; 701/70, 79, 1
See application file for complete search history.

(56) References Cited

U.S. PATENT DOCUMENTS

| | | | |
|---|---|---|---|
| 4,425,560 A | 1/1984 | Jones | |
| 4,916,431 A * | 4/1990 | Gearey | 340/479 |
| 5,309,141 A * | 5/1994 | Mason et al. | 340/467 |
| 5,796,333 A | 8/1998 | Niemann | |
| 7,254,387 B2 * | 8/2007 | Dunlop et al. | 455/418 |
| 7,529,609 B2 * | 5/2009 | Braunberger et al. | 701/70 |
| 7,541,918 B1 * | 6/2009 | Rizzi | 340/438 |
| 7,832,762 B2 | 11/2010 | Breed | |
| 7,944,349 B2 * | 5/2011 | Liu | 340/467 |
| 8,482,397 B1 * | 7/2013 | Tajiri | 340/467 |
| 2003/0137268 A1 | 7/2003 | Papanikolopoulos | |

OTHER PUBLICATIONS

John Voevodsky, "Evaluation of a deceleration warning light for reducing rear-end automobile collisions", Journal of Applied Psychology, vol. 59(3), Jun. 1974, pp. 270-273.

* cited by examiner

*Primary Examiner* — Phung Nguyen
(74) *Attorney, Agent, or Firm* — Sangwon Kim

(57) ABSTRACT

A sensor for actuating a vehicle warning signal includes a housing, a magnetically activated switch on an outside surface of the housing, and an electrical connection connecting the switch to a warning signaling device. The housing includes a cavity, at least one spring inside the cavity, and a moveable magnetic weight element adjacent the spring. In a first condition the weight element is located in a first resting, non-activating position remote from said switch, and in a second condition, during a deceleration of the vehicle, the weight element moves to compress the spring so that the weight element moves from the first position to a second activating position proximate the switch so that the switch is closed by magnetic interaction with the weight element, the closing of the switch causing the warning signaling device to be activated to provide a warning to following vehicles.

11 Claims, 2 Drawing Sheets

VEHICLE STOPPING AND MOVEMENT WARNING SENSOR

BACKGROUND OF THE INVENTION

The invention relates to a sensor for signaling a vehicle's sudden stopping or movement. The inventive sensor finds preferable application sensing an abrupt stopping or deceleration of the vehicle. The sensor may also be mounted to detect lateral or vertical vehicle movements caused by external reasons, e.g., potholes or other emergency movements by the driver in reaction to another rapidly approaching vehicle, a curb, an person, or an obstacle such as a utility pole.

DESCRIPTION OF THE RELATED ART

Prior art vehicles have included various kinds of factory equipped components such as an "emergency stop signal" where a special light signals when the vehicle is braked rapidly and severely so that a following driver can pay attention with special urgency. However, these emergency stop signals are only activated by manual systems such as brakes, steering wheel, or emergency lights by a police vehicle. Accordingly, when there are unforeseen obstacles, e.g., potholes, in front of a moving vehicle and not enough time to manually activate an emergency signal, e.g., brake signal, not only the vehicle is in danger but also a following vehicle will be in danger due to not receiving any warning signal.

Further, many sensors equipped with a vehicle are primarily providing warning signals to a driver of the vehicle, not a driver of a following vehicle.

SUMMARY OF THE INVENTION

The present invention is directed to a sensor for installation in a vehicle, e.g., as an aftermarket component, that provides warning signals of abrupt stopping or deceleration of the vehicle and any abrupt movement of the vehicle to a following driver.

In a preferred embodiment the inventive sensor includes a housing (1); a magnetically activated switch (5); and an electrical connection (6) to a warning signal device (10) of the vehicle (9). The housing (1) comprises a cavity (7) located inside the housing (1), a spring (2) located inside the cavity (7) and an adjacent moveable magnetic weight element (3). The sensor is operative so that in a first in-use condition the weight element is located in a first resting, non-activating position remote from said switch (5), and in a second in-use condition, during a deceleration of the vehicle, the weight element (3) moves to compress the spring (2) so that the weight element (3) moves from the first position to a second activating position proximate the switch so that the switch is closed by magnetic interaction with the weight element (3), the closing of the switch causing the warning signaling device (10) to be activated to provide a warning to following vehicles. Normally, the spring keeps the weight element (3) from moving to the second position proximate the switch. A second spring (2') and switch (5') allows for a third in-use condition.

DESCRIPTION OF THE PREFERRED EMBODIMENTS

Figure 1:
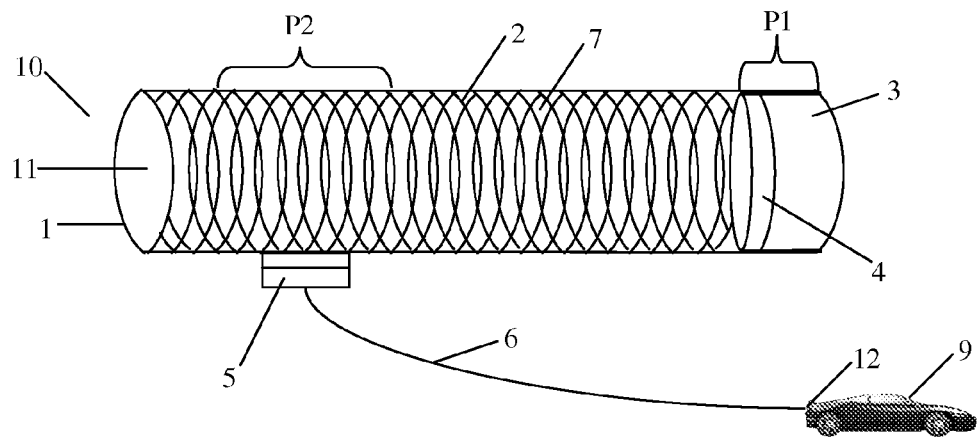
FIG. 1 is a sectional view of a sensor in a resting position with a switch embodiment of the invention.
Figure 2:
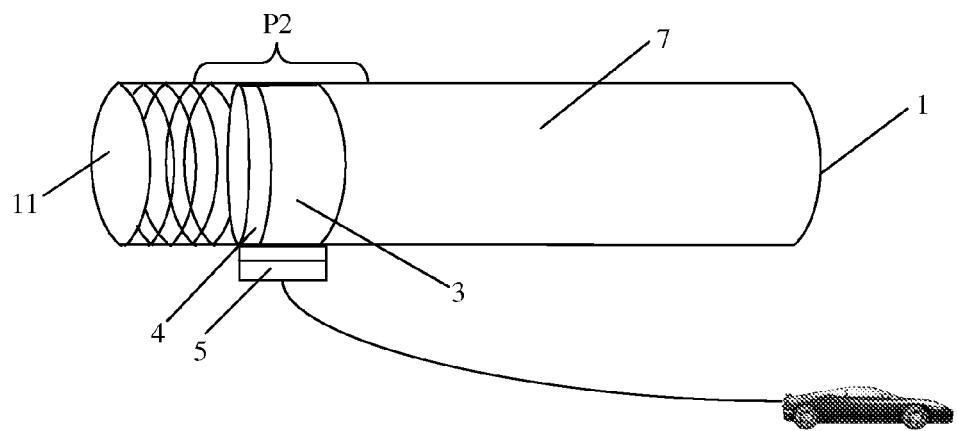
FIG. 2 illustrates an activating position of the invention.
Figure 3:
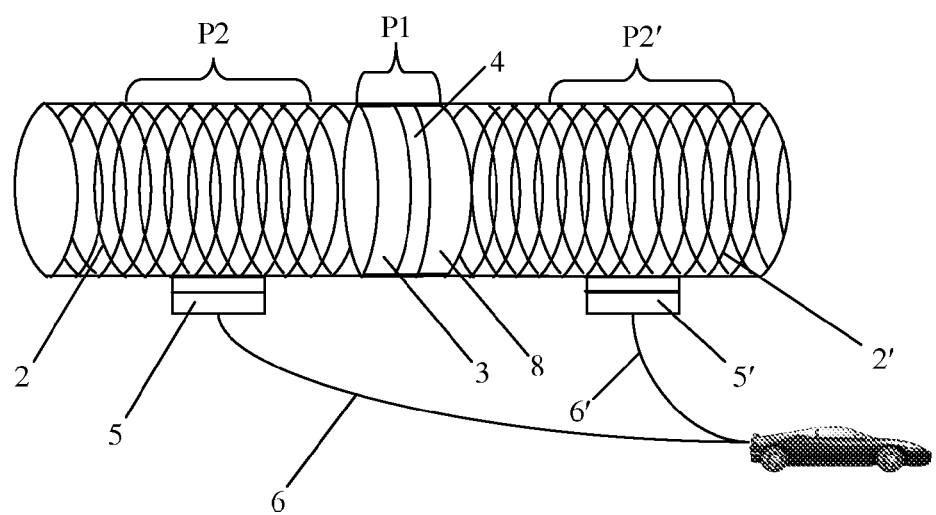
FIG. 3 is a sectional view of a sensor in a resting position embodiment of the invention.

One embodiment of the invention is illustrated in FIGS. 1 and 2. Another embodiment is illustrated in FIG. 3.

With reference to FIG. 1, the inventive sensor (10) comprises a housing (1). The housing is configured for installation within a vehicle (9). The housing (1) may have closed ends (11). The housing may be a cylindrical housing (1), although other geometries may be provided.

A magnetically activated switch (5) is located on an outside surface of the housing (1). An electrical connection (6) is provided to connect the switch (5) to a warning signal device (12) of the vehicle (9). The switch may be a normally-open switch. The electrical connection may comprise an electrical cable (6) connected between the switch (5) and the warning signal device (12) of the vehicle (9), although any suitable connection between the switch (5) and the vehicle warning signal device (12) may be used. The warning signal device (12) may comprise an existing warning light of the vehicle such as one or more of the braking lights, or may a dedicated warning light such as a light mounted in the vehicle's rear window. The warning light may be configured to flash at a distinctive frequency and/or varying intensity. The warning module may comprise a sound element.

The housing (1) may comprise a cavity (7), e.g., a cylindrical cavity, located inside the housing (1), a spring (2) located inside the cavity (7), and a moveable magnetic weight element (3) located inside the cavity (7) adjacent the spring (2).

In a first in-use condition in FIG. 1, the weight element is located in a first resting, non-activating position (P1) magnetically remote from said switch (5) at a distance where the weight element does not cause the switch to become activated, e.g., closed.

In a second in-use condition in FIG. 2, during a sudden/abrupt deceleration/stopping of the vehicle, the weight element (3) moves from the first position (P1) to compress the spring (2) so that the weight element (3) moves to a second activating position (P2) magnetically proximate the switch so that the switch is activated, e.g., closed, by magnetic interaction with the weight element (3). The activation or closing of the switch causes the warning signaling device (10) to be activated to provide a deceleration warning to following vehicles.

In normal driving of the vehicle, the spring (2) keeps the weight element (3) from moving to the second position proximate the switch.

Advantageously, the sensor (1) includes a cavity (7) located inside the sensor (1), a spring (2) located inside the cavity (7), and a moveable weight element (3) located inside the cavity (7).

Additionally, the moveable weight element (3) includes a housing element (8) containing a magnet (4) located therein.

The weight element (3) is adapted to move, via spring compression and expansion, between an activating position (P2) and a resting position (P1).

With reference to FIG. 2, with a normally-open switch (5), the switch (5) closes in the activating second position (P2) with the spring (2) compressed as shown and opens in the resting first position (FIG. 1, P1) with the spring expanded as shown. When the switch (5) is closed, the closed switch (5) activates the warning signal (10). The switch (5) is therefore positioned at the second activating position (P2) so that the switch is closed by magnetic interaction with the weight element (3).

A total length of the combined expanded spring (2) and weight element (3) may be same or longer than a length of the sensor (1). A diameter of the housing element (8) can also be same or larger than a diameter of the spring (2).

With reference to FIG. 3, the moveable weight element (3) may also be positioned in the middle of the housing (1). In this embodiment, two springs (2, 2') are provided, one spring (2) is positioned on each side of the weight element at a corresponding end of the housing (1) so that the weight element (3) is located intermediate the two springs (2, 2'). The two springs (2, 2') bias the weight element (3) to the resting first position (P1). The resting first position (P1) of the weight element (3) is located in the middle of the housing length, and the second activating position (P2, P2') may be at either end of housing (1) of the sensor (10).

A magnetically activated switch (5, 5') may be provided at each end of the housing (1) to provide two activating positions (P2, P2'). With two switches (5, 5'), the sensor (10) of FIG. 3 may be mounted transverse to a length of the vehicle to detect sudden light and right movements of the vehicle, e.g., when the driver suddenly turns the vehicle steering wheel to either the left or right. A second electrical connection (6') is provided to connect the second switch (5') to the warning signal device (12) of the vehicle (9).

Thus, in a third in-use condition, the weight element (3) moves to compress the second spring (2') so that the weight element (3) moves from the first position to a third activating position (P2') proximate the second switch (5') so that the second switch (5') is closed by magnetic interaction with the weight element (3), the closing of the second switch (5') causing the warning signaling device (12) to be activated to provide a warning to following vehicles. In normal driving of the vehicle, the second spring (2') keeps the weight element (3) from moving to the third position proximate the switch.

The FIG. 3 embodiment may also be mounted vertically to detect vehicle movement in a vertical direction.

The invention claimed is:

1. A sensor (10) for actuating a vehicle warning signal, comprising:
   a housing (1);
   a magnetically activated switch (5) located on an outside surface of the housing (1); and
   an electrical connection (6) for connecting the switch (5) to a warning signal device (12) of the vehicle (9),
   the housing (1) comprising
   a cavity (7) located inside the housing (1),
   a first spring (2) located inside the cavity (7), and
   a moveable magnetic weight element (3) located inside the cavity (7) adjacent the spring,
   wherein, in a first in-use condition the weight element is located in a first resting (P1), non-activating position remote from said switch (5),
   wherein, in a second in-use condition, during a deceleration of the vehicle, the weight element (3) moves to compress the first spring (2) so that the weight element (3) moves from the first position to a second activating position (P2) magnetically proximate the switch so that the switch is closed by magnetic interaction with the weight element (3), the closing of the switch causing the warning signal device (12) to be activated to provide a deceleration warning to following vehicles, and
   wherein, in normal driving of the vehicle, the first spring keeps the weight element (3) from moving to the second position proximate the switch.

2. The sensor of claim 1, wherein,
   the housing (1) is a cylindrical housing (1),
   the moveable magnetic weight element (3) comprises a housing element (8) containing a magnet (4) located therein,
   the moveable magnetic weight element (3) is located inside the cavity (7) bearing against the first spring, wherein in the first in-use condition the spring biases the weight element to the first position located remote from said switch (5), and
   the electrical connection is a cable (6) connected between the switch (5) and the warning signaling device (10) of the vehicle (9).

3. The sensor of claim 2, wherein,
   the switch (5) closes in the activating second position (P2) and opens in the resting non-activating first position (P1).

4. The sensor of claim 1, wherein,
   a total combined expanded length of the first spring (2) and the weight element (3) is equal to or longer than a length of the cavity of the housing (1).

5. The sensor of claim 1, wherein, a diameter of the housing element (8) is equal to or larger than a diameter of the first spring (2).

6. The sensor of claim 2, wherein, the cylindrical housing (1) has closed ends (11).

7. The sensor of claim 1, further comprising a second spring (2'), the weight element (3) being located intermediate the first and second springs.

8. The sensor of claim 7, further comprising an additional magnetically activated switch (5') located on an outside surface of the housing (1), wherein, in a third in-use condition the weight element (3) moves to compress the second spring (2') so that the weight element (3) moves from the first position to a third activating position (P2') proximate the second switch (5') so that the second switch (5') is closed by magnetic interaction with the weight element (3), the closing of the second switch (5') causing the warning signaling device (12) to be activated to provide a warning to following vehicles, and wherein, in normal driving of the vehicle, the second spring (2') keeps the weight element (3) from moving to the third position proximate the switch.

9. A sensor (10) for actuating a vehicle warning signal, comprising:
   a housing (1); first and second magnetically activated switches (5, 5') located on an outside surface of the housing (1); and
   electrical connections (6, 6') for connecting the first and second switches (5, 5') to a warning signal device (12) of the vehicle (9),
   the housing (1) comprising
   a cavity (7) located inside the housing (1),
   first and second springs (2) located inside the cavity (7), and
   a moveable magnetic weight element (3) located inside the cavity (7) between the first and second springs,
   wherein, in a first in-use condition the weight element is located in a first resting, non-activating position magnetically remote from said first and second switches,
   wherein, in a second in-use condition, during a first movement of the vehicle, the weight element (3) moves to compress the first spring (2) so that the weight element (3) moves from the first position to a activating second position (P2) magnetically proximate the first switch so that the first switch is activated by magnetic interaction with the weight element (3), the activation of the first switch causing the warning signaling device (12) to be activated to provide a warning to following vehicles, wherein, in a third in-use condition the weight element (3) moves to compress the second spring (2') so that the weight element (3) moves from the first position to an activating third position (P2') proximate the second switch (5') so that the second switch (5') is activated by magnetic interaction with the weight element (3), the activation of the second switch (5') causing the warning signaling device (12) to be activated to provide a warning to following vehicles, and wherein, in normal driving of the vehicle, the first and second springs keep the weight element (3) from moving from the first position to either of the second and thirds position.

10. The sensor of claim 9, wherein, the housing (1) is a cylindrical housing (1), the moveable magnetic weight element (3) comprises two housing elements (8) and a magnet (4) located in between two housing elements (8), and the electrical connections are a cable (6) connected between the first and second switches to the warning signaling device (10) of the vehicle (9).

11. The sensor of claim 9, wherein, the switch is a normally-open switch, and the switch (5) closes in the activating second position (P2) and opens in the resting non-activating first position (P1).

\* \* \* \* \*